United States Patent

[11] 3,573,611

| [72] | Inventors | Gerald T. Bergemann; Ernest N. Dulaney; Robert H. Pool, Marion, Iowa |
|---|---|---|
| [21] | Appl. No. | 793,529 |
| [22] | Filed | Jan. 23, 1969 |
| [45] | Patented | Apr. 6, 1971 |
| [73] | Assignee | Collins Radio Company Dallas, Tex. |

[54] SIMULTANEOUS DELAY MEASUREMENT BETWEEN SELECTED SIGNAL FREQUENCY CHANNELS AND REFERENCE FREQUENCY CHANNEL
24 Claims, 4 Drawing Figs.

| [52] | U.S. Cl. | 324/57, 324/77 |
|---|---|---|
| [51] | Int. Cl. | G01r 27/00 |
| [50] | Field of Search | 324/57, 77 |

[56] References Cited
UNITED STATES PATENTS

| 2,617,855 | 11/1952 | Etheridge, Jr. | 324/57 |
| 2,767,373 | 10/1956 | Maggio | 324/57 |
| 3,411,080 | 11/1968 | Palatinus | 324/57 |
| 3,467,859 | 9/1969 | Nixon et al. | 324/57 |

Primary Examiner—Edward E. Kubasiewicz
Attorneys—Larry Harold Kline and Robert J. Crawford ABSTRACT: The present invention relates to means for simultaneously measuring differential envelope delay between selected signal frequency channels and a reference frequency channel during transmission through a communications link. A test signal is applied to a bank of band-pass filters which separate the test signal into a reference frequency channel and a plurality of signal frequency channels. The signals of each channel are demodulated and passed to a phase shifting means which is adjustable to establish zero differential delay between the respective signal channel and the reference channel. Thereafter, the test signal is transmitted through the communications link and the output of the communications link is applied to the filter bank. A plurality of delay detecting means each measure differential delay between a respective signal channel and the reference channel and provide a delay signal to suitable indicating means.

FIG. 2a

Patented April 6, 1971

INVENTORS.
GERALD T. BERGEMANN
ERNEST N. DULANEY
ROBERT H. POOL

BY Larry Harold Kline
ATTORNEY

Patented April 6, 1971

INVENTORS.
GERALD T. BERGEMANN
ERNEST N. DULANEY
ROBERT H. POOL

BY Larry Harold Kline
ATTORNEY

INVENTORS.
GERALD T. BERGEMANN
ERNEST N. DULANEY
ROBERT H. POOL

BY Larry Harold Kline
ATTORNEY

SIMULTANEOUS DELAY MEASUREMENT BETWEEN SELECTED SIGNAL FREQUENCY CHANNELS AND REFERENCE FREQUENCY CHANNEL

This invention relates to measurement of differential delay, i.e. differential envelope delay, and more particularly to simultaneous measurement of differential delay between selected signal frequency channels and a reference frequency channel.

For various applications, it may be desirable to provide a set of output voltages dependent on the time delay appearing in various frequency channels within a given frequency range relative to the time delay observed at one specific frequency channel.

Devices which provide a measure of differential delay are well known. Some of these devices provide a measure of differential delay at only one selected frequency at any one time. Other devices sweep the frequency range of interest providing a continuous measure of delay as a function of frequency. These two techniques may be advantageous in certain circumstances, but neither of these techniques provide for a simultaneous measure of differential delay over the frequency band of interest. The present invention uses spaced-tones frequency spectrums, multiple double-sideband, suppressed-carrier frequency spectrums and multiple amplitude-modulated frequency spectrums as test signals to measure differential delay simultaneously at selected channels of frequencies over a frequency range.

An object of the present invention is a method and means for simultaneously measuring differential delay in a communications link in selected frequency channels over a frequency range.

Another object of this invention is a method and means for providing output indications of differential delay at different frequencies simultaneously.

Still another object of this invention is a method and means capable of noting changes in differential delay at various frequencies in the band simultaneously.

Another object of the invention is the use of a multiple double-sideband, suppressed-carrier frequency spectrum as a test signal to measure differential delay simultaneously at selected frequency channels over a frequency range.

A further object of the invention is the use of a spaced-tones frequency spectrum as a test signal to measure differential delay simultaneously at selected frequency channels over a frequency range.

Another object of the invention is the use of multiple amplitude-modulated frequency spectrums as a test signal to measure differential delay simultaneously at selected frequency channels over a frequency range.

These and other objects and features of the invention will be apparent from the following description an appended claims.

Briefly, the circuit for receiving a test signal transmitted through a communications link and for simultaneously measuring differential delay in the communications link between selected signal frequency channels and a reference frequency channel includes a plurality of band-pass filters each passing signals in one of the selected frequency channels or in the reference frequency channel. One of a plurality of detecting means is connected to each of the plurality of band-pass filters and each demodulates the output waveform of one of the band-pass filters. One of a plurality of phase shifting means is connected to the output of each detecting means. Each phase shifting means may be adjusted to establish a zero differential delay between one of the selected frequency channels and the reference frequency channel. The invention has a plurality of differential delay detecting means each of which is connected to the output of one of the phase shifting means and each of which is also connected to the output of the phase shifting means which modifies signals from the reference channel. An output voltage is developed which is dependent on the difference in delay between signals in one of the plurality of selected frequency channels and signals in the reference frequency channels.

The invention will be more fully understood from the following detailed description and appended claims when taken with the drawings in which:

FIG. 1 is an illustration of a test signal which is a multiple double-sideband, suppressed-carrier frequency spectrum.

FIG. 2, consisting of FIGS. 2a and 2b, illustrates a differential delay measurement circuit showing one signal channel and the reference channel.

Figure 1:
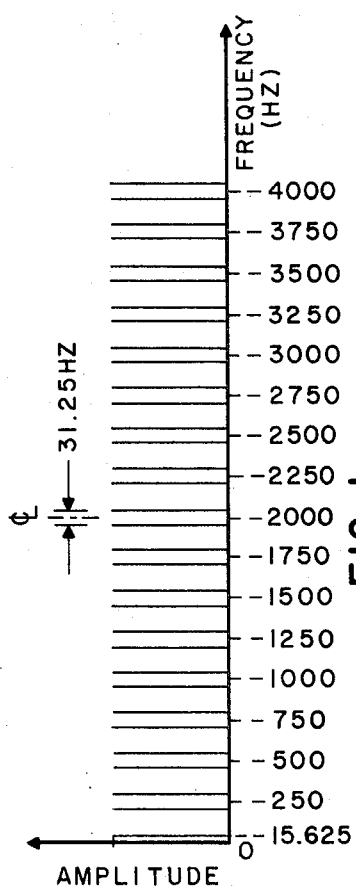

Referring now to the drawings, FIG. 1 shows a multiple double-sideband, suppressed-carrier frequency spectrum which may be used as an appropriate test signal for the simultaneous measurement of differential delay. The spectrum of FIG. 1 may be generated as disclosed in copending application, "Logic Pulse Time Waveform Synthesizer" by Ernest N. Dulaney, William S. Elliott, Charles F. Haberly, and Robert H. Pool filed Dec. 20, 1968.

The frequency spectrum of FIG. 1 is, of course, only an example of one test signal that might be used. The test signal may have spectrum sets using a group of three tones generated by sinusoidal amplitude modulation of the carrier; it may have spaced tones at the frequencies of interest; it may be a multiple double-sideband spectrum such as FIG. 1; or it may be any other spectrum which meets the following criterion for an appropriate test signal:

An appropriate test signal is one which has a frequency spectrum made of a plurality of identical spectrum sets with one spectrum set occurring at each frequency of interest for delay measurements. Each spectrum set may have two or more spectrum lines. In the case of a spaced-tones frequency spectrum, adjacent spectrum sets may make use of a common spectrum line. Each spectrum set is at a particular center frequency and has known fixed phase relationships within itself and with all the other sets at different center frequencies. Each spectrum set must be such that the time waveform related to the set provides some form of time indexing.

Using either the spaced-tones spectrum or the multiple double-sideband, suppressed-carrier spectrum for the measurement of differential delay has certain advantages. The main advantage in using these two types of test signals for delay measurements is that the signal of interest is more powerful than that of the conventional amplitude modulation having a center frequency and two sidebands. This greater power produces increased detectability of the delay in the presence of noise. Another advantage of the spaced-tones spectrum is that the spectrum between each of the two tones in any group may be used for other information transmission that does not overlap the tones directly.

Figure 2A:
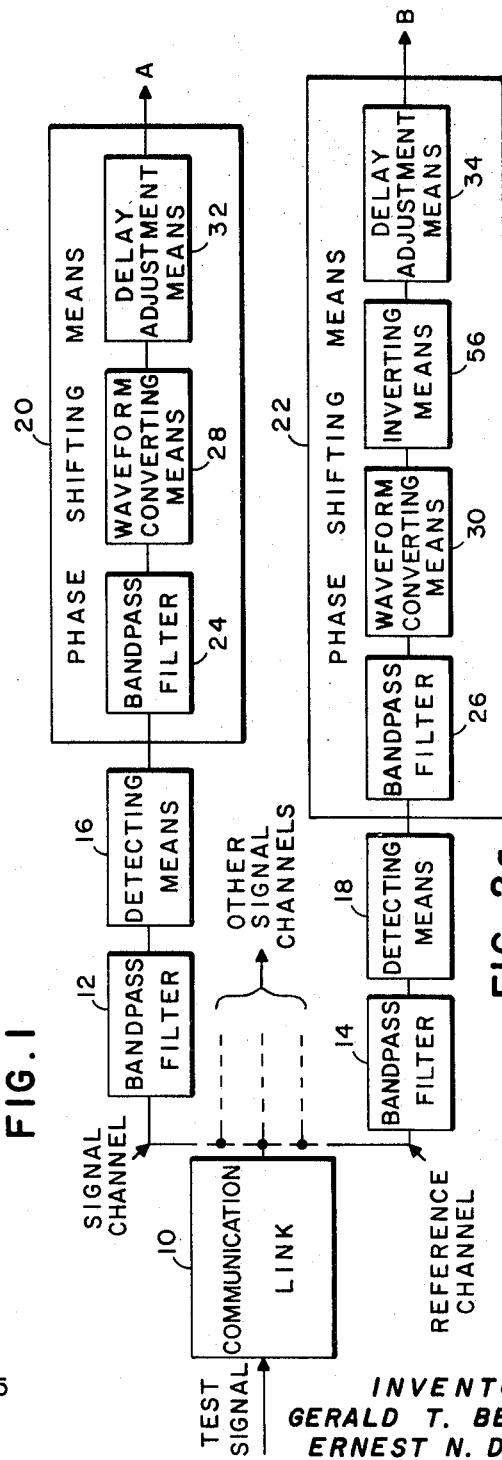
Figure 2B:
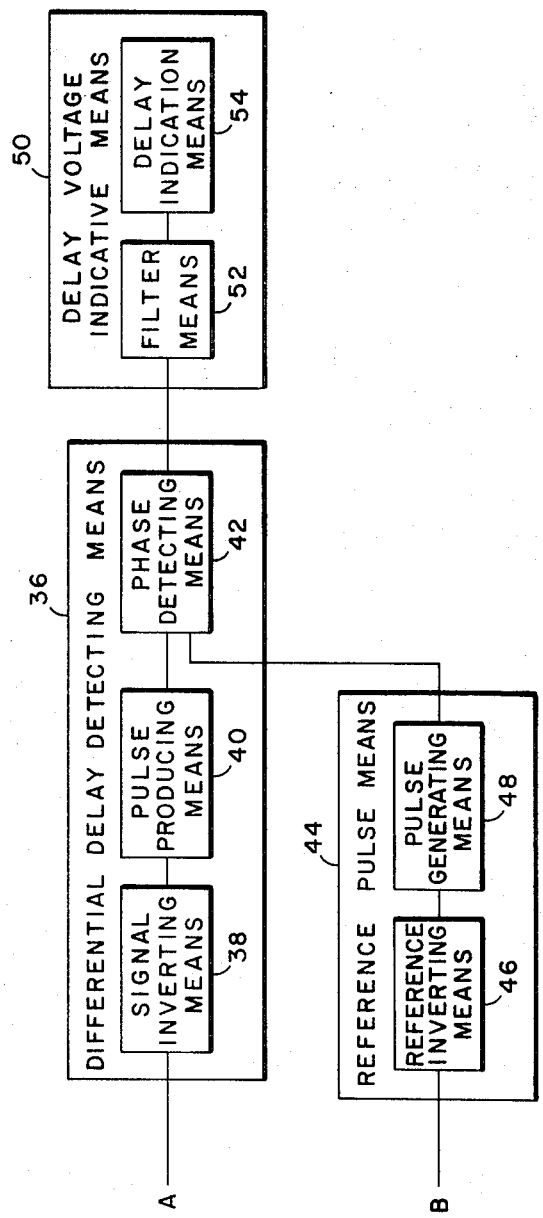

FIG. 2 illustrates in block diagram form the circuitry involved in measuring delay simultaneously at a plurality of frequencies for the test signal of FIG. 1. The test signal enters the communications link 10 through which the delay is to be measured. The output of the communications link 10 is connected to a plurality of band-pass filters each of which passes signals of frequencies in one of the frequency channels of interest. Each band-pass filter allows only one spectrum set to pass through the filter. One filter is therefore required for each desired set of frequencies to be passed. One of the band-pass filters 14 passes a channel of frequencies to be hereafter referred to as the reference frequency channel. Band-pass filter 12 passes a channel of frequencies referred to as a signal frequency channel. FIG. 2 only shows the circuitry involved for one signal channel to be tested and for the reference channel. There may be many more signal channels. The circuitry for signal channels at other frequencies of interest is identical to that for the signal channel shown.

Connected to each band-pass filter is a detecting means indicated as 16 in the signal channel and 18 in the reference channel. Each detecting means demodulates the output waveform of the band-pass filter to which it is connected.

When the multiple double-sideband, suppressed-carrier frequency spectrum of FIG. 1 is used, these detectors will be envelope detectors. With other types of test signals, other types of detectors could be used.

Connected to each detecting means is a phase shifting means indicated as 20 in the signal channel and 22 in the reference channel. Each phase shifting means is capable of performing a phase shift to the output signal of the detecting means to which it is connected. The phase shifting means is adjusted for zero differential delay between a signal channel and the reference channel. To make this adjustment, the test signal is directly applied at the input of band-pass filters 12 and 14 without passing through the communications link 10. The phase shifting means 20 in the signal channel would normally be the one that is adjusted to indicate a zero phase shift between the signal channel and the reference channel. This adjustment is necessary so that the circuitry will indicate only the true delay caused by the communications link 10.

The phase shifting means 20 and 22 may comprise a band-pass filter, 24 in the signal channel and 26 in the reference channel; a waveform converting means, 28 in the signal channel and 30 in the reference channel; and a delay adjustment means, 32 in the signal channel and 34 in the reference channel. The band-pass filters, 24 and 26, pass the fundamental frequency of the output signal of the detecting means, 16 or 18, to which it is connected. In certain applications, band-pass filters 24 and 25 would not be necessary, for example, when detector means 16 and 18 have sinusoids for outputs.

The waveform converting means, 28 and 30, are connected to the output of the band-pass filters, 24 and 26. When these filters are not used, waveform converting means, 28 and 30, would be connected directly to the output of detecting means, 16 and 18. The waveform converting means, 28 and 30, convert their input signal into logic level waveforms. The waveform converter means, 28 and 30, may be Schmitt trigger circuits or some type of clipping means. Delay adjustment means, 32 and 34, are respectively connected to waveform converting means, 28 and 30. The delay adjustment means, 32 and 34, are capable of performing a phase shift adjustment at the output of the waveform converter means, 28 and 30.

An inverting means 56 may be placed in the reference channel within the phase shifting means to provide a known phase shift between the reference channel and a signal channel so that both lead and lag phase differences may be easily indicated. In FIG. 2, inverting means 56 is shown serially connected with waveform converting means 30 and delay adjustment means 34. The delay adjustment means 32 and 34 may be comprised of a monostable multivibrator. If the input to the delay adjustment means 32 and 34 is designated to be a sinusoid, an analog phase shifter may be used. The waveform converting means and the delay adjustment means are connected in series. Depending on the type of input signal used, the delay adjustment means could precede the waveform converting means.

Connected to the phase shifting means in the signal channel is a differential delay detecting means 36 which is also connected to the reference channel. The differential delay detecting means 36 develops the output voltage which is dependent on the difference in delay between the signals in the signal channel and signals in the reference channel. The differential delay detecting means 36 may comprise a signal inverting means 38, a pulse producing means 40 and a phase detecting means 42. The signal inverting means is connected to and inverts the output signal of the output of the phase shifting means 20. Pulse producing means 40 is connected to the output of the signal inverting means and produces a narrow pulse from the output of the inverter means. Phase detecting means 42 is connected to pulse producing means 40 and to the reference channel through reference pulse means 44. Reference pulse means 44 is connected to phase shifting means 22 in the reference channel. The reference pulse means 44 may comprise reference inverting means 46 and pulse generating means 48. The reference inverting means 46 inverts the output of phase shifting means 22. Pulse generating means 48 produces a narrow pulse from the output of the reference inverting means 46. This output pulse of reference pulse means 44, along with the output of pulse producing means 40, are inputs to phase detecting means 42.

Phase detecting means 42 may be simply a direct coupled bistable multivibrator. When the signal input goes to a logic zero, the multivibrator is reset. When the reference input goes to a logic zero, the multivibrator is set. In this manner, the timing sequence of the signal inputs controls the length of time that the phase detecting means 42 has a specific output voltage. The output voltage of the phase detecting means 42 is therefore dependent on the difference in delay between the signals in the reference channel and in the signal channel.

Connected to the differential delay detecting means 36 is delay voltage indication means 50 which may comprise filter means 52 and delay indicating means 54. The filter means 52 has an output voltage which is directly proportional to the differential delay between the reference channel and the signal channel. A low pass filter which would allow only the frequency components near zero frequency to appear at the outputs thereby rejecting all higher frequency components may be used as the filter means 52. The delay indication means 54 could be a voltmeter indicating the voltage at the output of filtering means 52. The delay indication means 54 could be an indication by some computer means or any other means that would allow either man or machine to recognize the signal at the input of the delay indication means.

In the preferred embodiment of this invention, the test signal is the test signal illustrated in FIG. 1. The detecting means 16 and 18 are envelope detecting means. Waveform converting means 28 and 30 are Schmitt trigger circuits. Delay adjustment means 32 and 34 are monostable multivibrators. Signal inverting means 38 and reference inverting means 46 are logical inverters in which when one signal is supplied to the inverter, the binary value of the output signal is opposite to that of the input signal. In other words, when the input is 1, then the output is 0. The pulse producing means 40 and the pulse generating means 48 are monostable multivibrators. The phase detecting means 42 is a bistable multivibrator. Filter means 52 would be a low pass filter. Delay indication means 54 would be a combination of indication means including meter read-outs and computer print-outs. Amplification means (not shown) would, in the preferred embodiment, amplify the output signals of each of the plurality of band-pass filters, each of the plurality of detecting means, and each of the plurality of phase detecting means.

Figure 3:
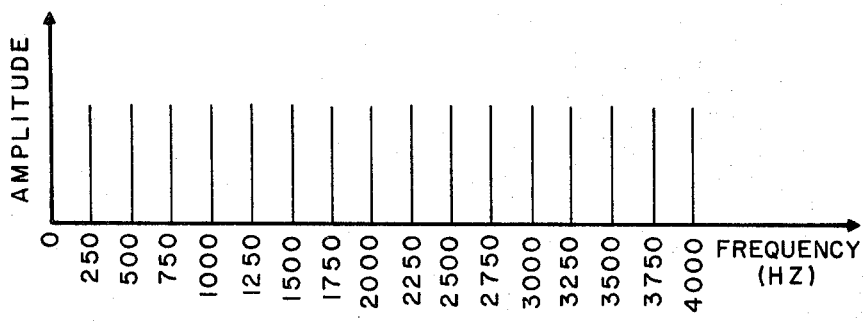
FIG. 3 is an illustration of a test signal which is a spaced-tones frequency spectrum.

FIG. 3 illustrates a spaced-tones frequency spectrum test signal. The spaced tones in FIG. 3 are 250 hertz apart, but could be separated by any distance in the spectrum range.

Figure 4:
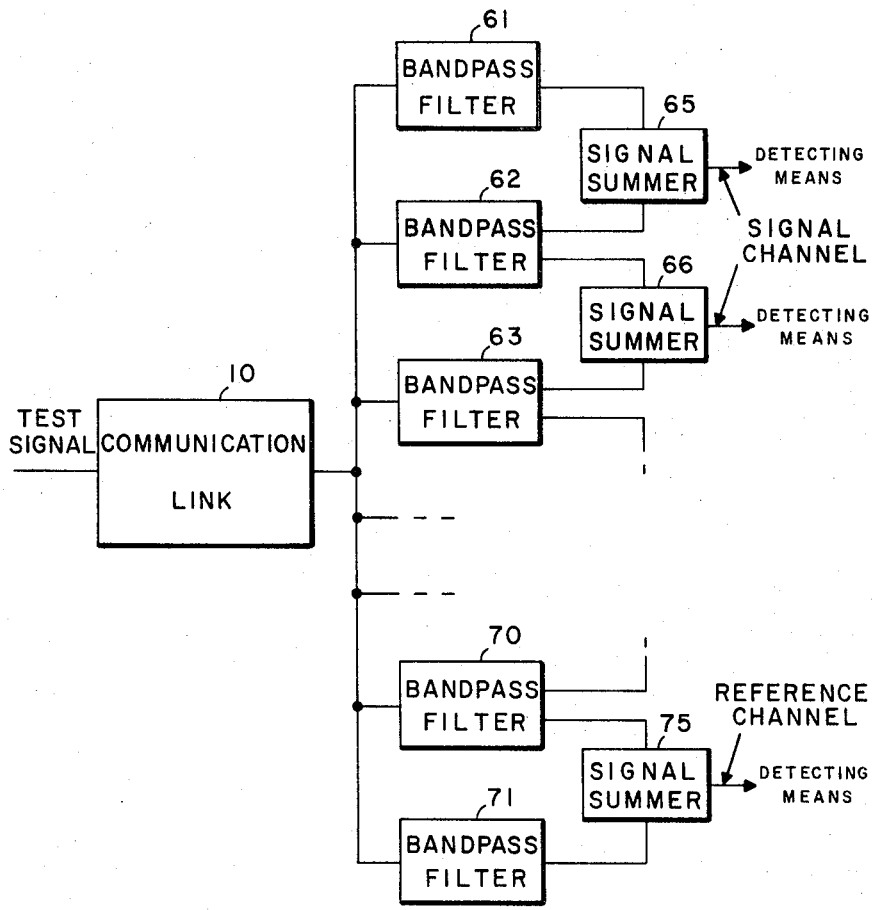
FIG. 4 illustrates circuit adjustments for use with a spaced-tones frequency spectrum test signal.

To measure simultaneous differential delay with the spaced-tones test signal, the circuit has to be changed as indicated in FIG. 4. A plurality of band-pass filters still pass signals of frequencies in the selected frequency channels. Each band-pass filter, however, will now only pass one tone. The output of two band-pass filters is combined in a signal summer to obtain a signal equivalent to what is obtained from either band-pass filters 12 or 14 in FIG. 2. In FIG. 4, the outputs of band-pass filters 61 and 62 are combined in signal summer 65 to establish one signal channel. The outputs of band-pass filters 62 and 63 are combined in signal summer 66 to establish another signal channel. Any number of signal channels can be obtained in this manner, although only two signal channels are shown in FIG. 4.

The reference channel in FIG. 4 is obtained in the same manner as the signal channels. Two tones passing through band-pass filters 70 and 71 are combined in signal summer 75 to obtain a signal equivalent to what is obtained from band-pass filter 14. The output of signal summer 75 is connected to a detecting means such as detecting means 18 in FIG. 2. The outputs of signal summers 65 and 66 are connected to detecting means such as detecting means 16 in FIG. 2. The signal and reference channel circuits following the detecting means may be equivalent to that in FIG. 2 and have previously been discussed.

While the invention has been described with reference with specific embodiments, the description is illustrative and is not to be construed as limiting the scope of the invention. Various modifications and changes may occur to those skilled in the art without departing from the spirit and scope of the invention as defined by the appended claims.

We claim:

1. A circuit for measuring differential delay between selected signal frequency channels and a reference frequency channel resulting from transmission through a communications link, said circuit comprising:

means for generating a test signal containing a plurality of selected signal frequency channels together with a reference frequency channel and connected to transmit said test signal through a communications link under test;

a plurality of band-pass filters each connected to said communications link and serving to pass signals of frequencies in a respective one of the frequency channels of said test signal;

a plurality of detecting means each connected to a respective one of said band-pass filters and serving to demodulate the output waveform of said respective one of said band-pass filters;

a plurality of phase shifting means each connected to a respective one of said detecting means and serving to perform a phase shift on the output signal from said respective one of said detecting means so as to permit adjustment for zero differential delay between the respective selected frequency channel and said reference frequency channel; and a plurality of differential delay detecting means each connected to receive the output of a respective one of said phase shifting means and each connected to receive the output of that one of said phase shifting means which modifies signals from said reference channel and serving to develop an output voltage dependent on the difference in delay between the signals from said respective one of said phase shifting means and the signals from said reference channel.

2. The circuit of claim 1 further comprising adjustment means included in each of said phase shifting means for adjusting the phase shift of the output signal from said respective one of said detecting means.

3. A circuit according to claim 2 wherein said each of said phase shifting means further comprises:
   a. a second plurality of band-pass filters, each connected to and passing the fundamental frequency of the output of said respective one of said plurality of detecting means; and
   b. a plurality of waveform converting means, each serially connected to the output of a respective one of said second plurality of band-pass filters and converting the output of said respective one of said second plurality of band-pass filters into logic level waveforms.

4. A circuit according to claim 1 wherein said plurality of differential delay detecting means comprises:
   a. a plurality of signal inverting means, each connected to and inverting the output signals of a respective one of said plurality of phase shifting means;
   b. a plurality of pulse producing means each connected to and producing a narrow pulse from the output of a respective one of said plurality of signal inverting means; and
   c. a plurality of phase detecting means each connected to the output of a respective one of said plurality of pulse producing means and to a reference pulse from circuitry modifying signals from said reference frequency channel, whereby the timing sequence of the signal inputs from each of said plurality of pulse producing means and from said reference pulse controls the time length of the output signals of the respective one of said plurality of phase detectors.

5. A circuit according to claim 2 wherein said plurality of differential delay detecting means comprises:
   a. a plurality of signal inverting means, each connected to and inverting the output signals of a respective one of said plurality of phase shifting means;
   b. a plurality of pulse producing means each connected to and producing a narrow pulse from the output of a respective one of said plurality of signal inverting means; and
   c. a plurality of phase detecting means each connected to the output of each one of said plurality of pulse producing means and to a reference pulse from circuitry of modifying signals from said reference frequency channel, whereby the timing sequence of the signal inputs from each of said plurality of pulse producing means and from said reference pulse controls the time length of the output signals of the respective one of said plurality of phase detectors.

6. A circuit according to claim 1 further comprising a plurality of delay voltage indication means each connected to a respective one of said plurality of differential delay detecting means and each indicating the differential delay between said reference frequency channel and a respective one of the said selected signal frequency channels.

7. A circuit according to claim 6 in which said plurality of delay voltage indication means comprises a plurality of filtering means each connected to a respective one of said plurality of differential delay detecting means and each having an output voltage which is directly proportional to the differential delay between said reference frequency channel and a respective one of the said selected frequency channels.

8. A circuit according to claim 6 wherein said delay voltage indication means comprises a plurality of delay indication means each serially connected to a respective one of said plurality of differential delay detecting means and each indicating the differential delay between said reference frequency channel and a respective one of said selected frequency channels.

9. A circuit according to claim 7 wherein said delay voltage indication means comprises a plurality of delay indication means each serially connected to a respective one of said plurality of differential delay detecting means and each indicating the differential delay between said reference frequency channel and a respective one of said selected signal frequency channels.

10. A circuit according to claim 1 further comprising a plurality of amplification means each amplifying the output signals of a respective one of said plurality of band-pass filters.

11. A circuit according to claim 1 further comprising a plurality of amplification means each amplifying the output signals of a respective one of said plurality of detecting means.

12. A circuit according to claim 4 further comprising a plurality of amplification means each amplifying the outputs of a respective one of said plurality of phase detecting means.

13. A circuit according to claim 3 further comprising an inverting means connected to the output of the one of said plurality of waveform converting means which modifies signals from said reference frequency channel.

14. A circuit according to claim 5 further comprising an inverting means connected to the output of the one of said plurality of waveform converting means which modifies signals from said reference frequency channel.

15. A circuit according to claim 7 wherein said plurality of filtering means comprises a plurality of low pass filters each allowing passage of only low frequency components of the output of a respective one of said plurality of phase detectors.

16. A circuit according to claim 4 wherein each of said plurality of pulse producing means comprises a monostable multivibrator.

17. A circuit according to claim 5 wherein each of said plurality of pulse producing means comprises a monostable multivibrator.

18. A circuit according to claim 4 wherein each of said plurality of phase detecting means comprises a bistable multivibrator.

19. A circuit according to claim 5 wherein each of said plurality of phase detecting means comprises a bistable multivibrator.

20. A circuit according to claim 3 wherein each of said plurality of waveform converting means comprises a Schmitt trigger circuit.

21. A circuit according to claim 3 wherein each of said plurality of delay adjustment means comprises a monostable multivibrator.

22. A circuit according to claim 5 further comprising reference pulse means serially connected with the one of said plurality of phase shifting means which modifies signals from said reference frequency channel and producing said reference pulse.

23. A circuit according to claim 22 wherein said reference pulse means comprises:
a. reference inverting means connected to and inverting the output signal of the one of said plurality of phase shifting means modifying signals from said reference frequency channel; and
b. pulse generating means connected to and producing a narrow pulse from the output signal of said reference inverting means.

24. A circuit according to claim 1 further comprising a plurality of signal summer means each connected to outputs of a respective pair of said plurality of band-pass filters.